United States Patent [19]
Nishii et al.

[11] Patent Number: 4,794,850
[45] Date of Patent: Jan. 3, 1989

[54] FLUID PRESSURE SERVOMOTOR

[75] Inventors: Michiharu Nishii, Toyota; Yuzuru Sugiura, Anjo, both of Japan

[73] Assignee: Aisin Seiki Kabushiki Kaisha, Kariya, Japan

[21] Appl. No.: 6,106

[22] Filed: Jan. 23, 1987

[30] Foreign Application Priority Data

Jan. 24, 1986 [JP] Japan .............................. 61-009317[U]

[51] Int. Cl.$^4$ .............................................. F15B 9/10
[52] U.S. Cl. ...................................... 92/168; 277/205
[58] Field of Search ................. 92/168 R; 277/188 R, 277/178, 183, 184, 205

[56]  References Cited

U.S. PATENT DOCUMENTS

| | | | |
|---|---|---|---|
| 4,053,166 | 10/1977 | Domkowski | 277/205 X |
| 4,169,604 | 10/1979 | Heathcott | 277/205 X |
| 4,472,997 | 9/1984 | Ohmi . | |
| 4,587,885 | 5/1986 | Boehm et al. . | |
| 4,590,845 | 5/1986 | Tateoka et al. . | |
| 4,594,937 | 6/1986 | Meynier et al. . | |
| 4,598,625 | 7/1986 | Belart . | |
| 4,619,185 | 10/1986 | Mori et al. . | |

FOREIGN PATENT DOCUMENTS 60-268 1/1985 Japan .

Primary Examiner—Gerald A. Michalsky
Attorney, Agent, or Firm—Burns, Doane, Swecker & Mathis

[57] ABSTRACT

A fluid pressure servomotor including a housing, a partition wall arranged in the housing, a center hole formed in the partition wall, a hub member having a cylindrical portion, a ring bearing for axially slidably guiding the cylindrical portion and fitted in the hole. A sealing member is fitted in the hole and includes a sealing portion hermetically contacted with the partition wall and a lip portion hermetically contacted with the cylindrical portion. A retainer is provided for retaining the sealing member and the ring bearing between the partition wall and the cylindrical portion. The sealing member and the ring bearing are engaged with each other by engagement of a groove and a projection formed thereon, respectively, so that the sealing member and the cylindrical portion are maintained in a coaxial relationship.

9 Claims, 4 Drawing Sheets

4,794,850

FLUID PRESSURE SERVOMOTOR

BACKGROUND OF THE INVENTION

1. Field of the Invention

This invention relates to fluid pressure servomotors of the type used to operate power brakes and the like, and particularly to a sealing mechanism for maintaining an airtight seal for a sliding portion of a hub member or the like.

2. Description of the Prior Art

As shown in FIG. 6, a fluid pressure servomotor of the type disclosed in U.S. Pat. No. 4,345,506 includes a partition wall 123 has a centrally located opening 123a, a sealing member 128 made of rubber and arranged in the opening 123a, a ring bearing 129 made of plastic material for axially slidably guiding a cylindrical portion 141A of hub member 141. The ring bearing member is arranged in the opening 123a. A retainer 191 is partially inserted in the sealing member 128 and pressed in the opening 123a together with the sealing member 128 and presses the ring bearing 129 to a flange portion 123b of partition wall 123 so as to retain the sealing member 128 and the ring bearing 129 in the opening 123a. A lip portion 128a of sealing member 128 is pressed into tight engagement with the cylindrical portion 141A of hub member so as to maintain an airtight sealing engagement between the lip portion 128a and the cylindrical portion 141A. However, in the foregoing sealing mechanism, the ring bearing 129 of plastic material shrinks in both radial and axial directions due to thermal hysteresis. As a result, the ring bearing 129 moves in relation to the sealing member 128. Also, the pressing force of the sealing member 128 of rubber to the cylindrical portion 141A of hub member decreases due to thermal deterioration of the sealing member 128. In this condition, the ring bearing and the sealing member 128 cannot be maintained in a co-axial position and the sealing member 128 and the cylindrical portion 141A guided by ring bearing 129 are likewise not maintained in a co-axial position. As a result, one portion of the sealing member 128 is pressed against the portion 141A with increased force and an opposite portion of the sealing member 128 will be loosely engaged or completely disengaged from the portion 141A. Consequently, the airtight engagement of the lip portion 128a of sealing member 128 with the portion 141A is interrupted and the performance of the servomotor decreases.

SUMMARY OF THE INVENTION

The present invention has solved the foregoing disadvantages of the prior art.

Therefore, one object of the present invention is to improve the sealing arrangement of a fluid pressure servomotor by maintaining an airtight seal in the event of thermal hysteresis effects of the ring bearing.

Another object of the present invention is to provide a fluid pressure servomotor which is easily assembled.

To complete these objects, the fluid pressure servomotor is constructed with a sealing member and a ring bearing made of plasticmaterial for slidably guiding a cylindrical portion of a hub member. The sealing member and the ring bearing member are engaged with each other by engaging means. The engaging means includes a groove formed on one of the sealing member or the ring bearing, and a projection formed on the other of the sealing member or the ring bearing and fitting in the groove. The sealing member is mounted in a center hole of a partition wall by a retainer. Therefore, even if the ring bearing shrinks and moves in axial and radial directions due to thermal hysteresis of the ring bearing, the sealing member is moved along with the ring bearing by engaging means. Therefor, the sealing member and the cylindrical portion guided by the ring bearing are maintained in a co-axial relationship. Consequently, a pressing force of sealing member to the cylindrical portion of hub member is equally maintained along any sealing portion of sealing member.

BRIEF DESCRIPTION OF THE DRAWINGS

Various other objects, features and attendant advantages of the present invention will be more fully appreciated as the same becomes better understood form the following detailed description when considered in connection with accompanying drawings.

DETAILED DESCRIPTION OF THE PREFERRED EMBODIMENTS

Figure 1:
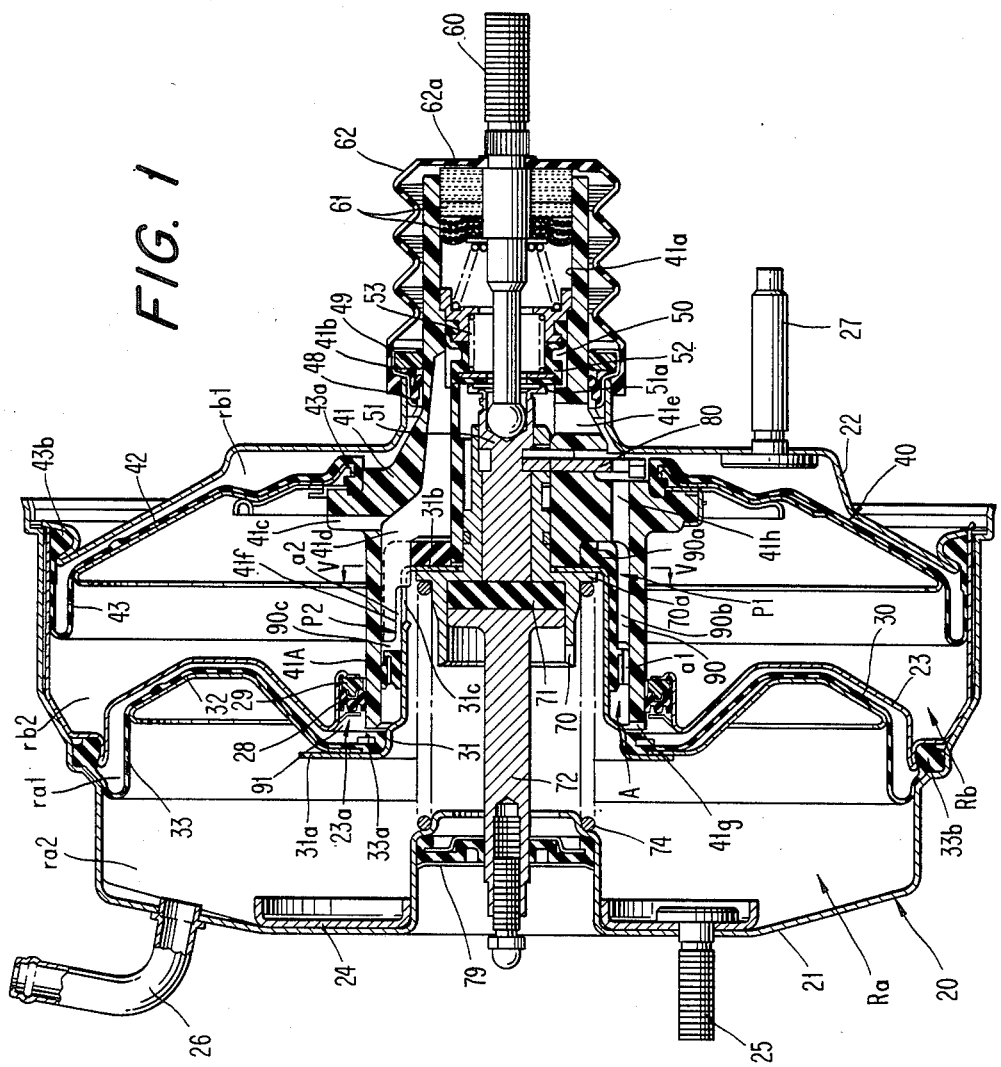
FIG. 1 is a cross-sectional view of a preferred embodiment of the present invention.

Referring now to the drawings, there is shown in FIG. 1 a brake booster housing 20 formed by a front shell section 21 and a rear shell section 22. Front and rear shell sections 21 and 22 are hermetically fixed with each other at opposed ends thereof. An interior of housing 20 is divided into a front chamber Ra and a rear chamber Rb by a cup-shaped partition wall 23 fixed within the front shell section 21. A front movable wall 30 is arranged in the front chamber Ra. A rear movable wall 40 is arranged in the rear chamber Rb. A circular reinforcing plate 24 is fixed to an inner side of front shell section 21. A plurality of bolts 25 are fixed to the reinforcing plate 24, only one of which is shown in the drawing. Each bolt 25 hermetically penetrates the reinforcing member 24 and the front shell section 21, and projects frontwardly for mounting a brake master cylinder (not shown). A connector 26 is connected with an engine intake manifold (not shown) and is hermetically fixed to the front shell section 21. A plurality of bolts 27 are fixed to the rear shell section 22, only one of which is shown in the drawing. Each bolt 27 hermetically penetrates the rear shell section 22 and projects rearwardly for mounting the housing on a vehicle body (not shown).

The front movable wall 30 includes a hub member 31, a circular plate 32 and a diaphragm 33, and divides the front chamber Ra into a variable pressure chamber ra1 and a constant pressure chamber ra2. The hub member 31 is formed to be a cylindrical member having a flange portion 31a at the front side thereof and a bottom wall 31b at the rear end thereof. The hub member 31 extends rearwardly past the partition wall 23 and extends to the rear chamber Rb so as to contact with a hub member 41. The plate 32 is welded to the flange portion 31a of hub member 31. The diaphragm 33 is arranged in contact with the rear surface of plate 32. An inner bead 33a of diaphragm 33 is hermetically sealed to the hub member 31. An outer bead 33b of diaphragm 33 is hermetically sealed between front shell section 21 and partition wall 23.

The rear movable wall 40 includes the hub member 41 made of plastic material, a circular plate 42 and a diaphragm 43. The rear movable wall 40 is divided into a variable pressure chamber rb1 and a constant pressure chamber rb2 within the rear chamber Rb. The variable pressure chamber rb1 communicates with the variable pressure chamber ra1 through a first passage P1 described hereinafter. The constant pressure chamber rb2 communicates with the constant pressure chamber ra2 through a second passage P2 described hereinafter. The hub member 41 extends to an exterior of housing 20 through a sealing member 48 and a bush 49 and mounts a control valve mechanism 50 in an opening 41a thereof. The plate 42 is hermetically fitted in the hub member 41 together with inner bead 43a of diaphragm 43. The diaphragm 43 is arranged at a rear surface of plate 42. An outer bead 43b of diaphragm 43 is hermetically sealed between rear shell section 22 and partition wall 23.

The control valve mechanism 50 is provided for communicating the variable pressure chamber rb1 with one of the constant pressure chamber rb2 or the atmosphere in response to the operation thereof. The control valve mechanism 50 includes a valve plunger 51 and a poppet valve 52. The valve plunger 51 is connected to one end of an input push rod 60 interconnected with a brake pedal (not shown) and is slidably supported in a guide 70 in an axial direction. The stroke of the plunger 51 is limited relative to the guide 70 by key member 80. The poppet valve 52 is arranged in the hole 41a of hub member 41 and is biased to frontwardly by a spring 53. The poppet valve 52 is selectively engaged with a valve seat 51a formed on a rear surface of valve plunger 51 and a valve seat 41b formed on the hub member 41 in response to the axial movement of input push rod 60.

When the poppet valve 52 is engaged with the valve seat 51a and disengaged with the valve seat 41b (rest condition of servomotor), the constant pressure chamber rb2 communicates with the variable pressure chamber rb1 through paths 41c and 41d formed in hub member 41, a gap between poppet valve 52 and valve seat 41b, and a path 41e formed in hub member 41. Alternatively, when poppet valve 52 engages with the valve seat 41b and disengages from the valve seat 51b (operating condition of servomotor), the variable pressure chamber rb1 communicates with the atmosphere through path 41e, a gap between poppet valve 52 and valve seat 51a, opening 41a and air filter 61. An aperture 62a for admitting air to the air filter is formed in a boot 62.

The guide 70 is of a stepped cylindrical shape and is hermetically fitted in a reduced diameter portion of opening 41a of hub member 41, and is prevented from movement by the key member 80. The guide 70 is engaged with the bottom wall 31b of hub member 31 at a stepped portion 71a thereof. A reaction rubber disk 71 is fitted in the stepped portion 71a of guide 70. The reaction rubber disk 71 is in contact with a rear end surface of an output push rod 72 which extends to the exterior of housing 20 through a seal member 78 and is engaged with a piston of a brake master cylinder (not shown). A spring 74 is disposed between front shell section 21 and stepped portion 70a of guide 70 so as to bias the front and rear movable walls 30 and 40 rearwardly. A cylindrical portion 41A of hub member 41 is axially slidably guided by a ring bearing 29 made of plastic material and arranged in a center hole 23a of the partition wall 23. The sliding portion of cylindrical portion 41A of hub member 41 is maintained airtight by a sealing member 28 made of rubber material and arranged in the opening 23a of partition wall 23. The cylindrical portion 41A of hub member 41 is fitted on the hub member 31 so that a cylindrical space A is formed between cylindrical portion 41A and a cylindrical portion of hub member 31 in a radial direction. A cylindrical sealing member 90 is disposed in the cylindrical space A.

Figure 5:
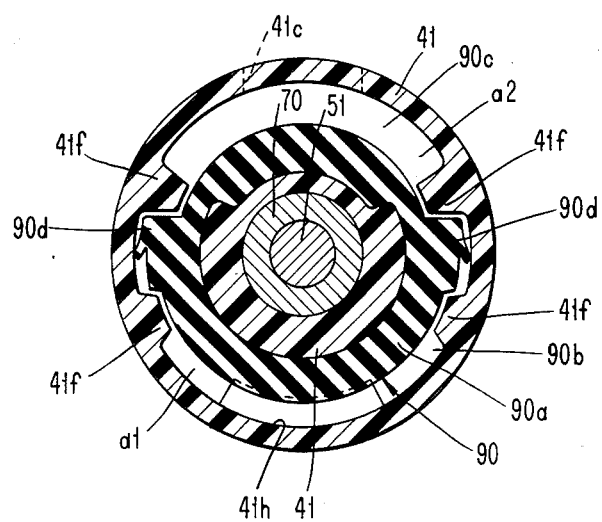
FIG. 5 is a cross-sectional view taken along line V—V of FIG. 1.
Figure 6:
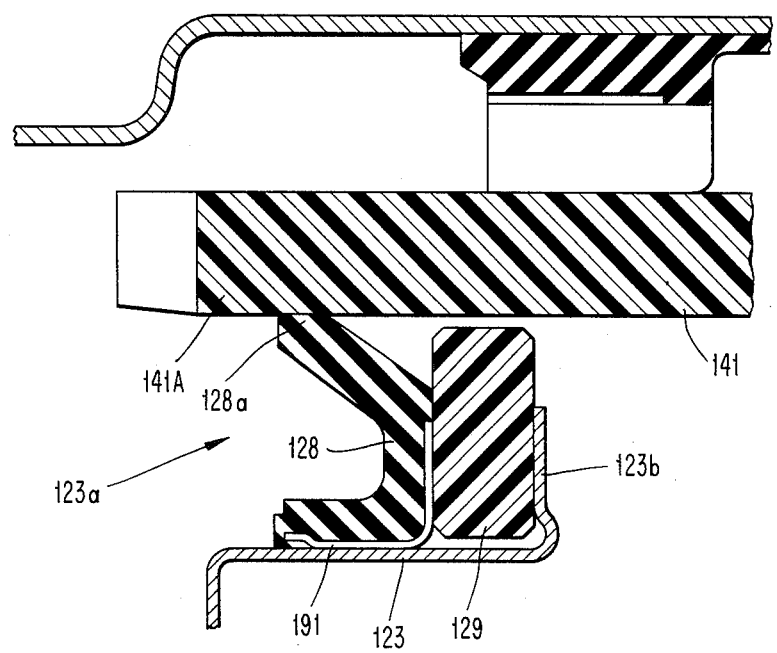
FIG. 6 is a partial enlarged view of conventional sealing mechanism of fluid pressure servomotor.

As shown in FIGS. 1 and 5, the cylindrical sealing member 90 includes a flange 90a hermetically fitted between the guide 70 and hub member 41 together with bottom wall 31b of hub member 31. An axial slot 90b is formed on an outer peripheral portion thereof, and an axial groove 90C extends rearwardly from a central portion. The cylindrical sealing member 90 is hermetically fitted between hub member 31 and the cylindrical portion 41A of hub member 41. A plurality of projections 90d, formed on an outer peripheral portion of the cylindrical seating member 90, extends in an axial direction so as to engage with a plurality of ribs 41f formed in an inner surface of cylindrical portion 41A of hub member 41 so that rotation of cylindrical sealing member 90, relative to cylindrical portion 41A of hub member 41, is prevented.

A path a1 is formed with axial slot 90b of cylindrical sealing member 90, hub member 31 and cylindrical portion 41A of hub member 41. The path a1 communicates with the variable pressure chamber ra1 of front chamber Ra via a radial slot 41g formed in the front portion of cylindrical portion 41A and also communicates with the variable pressure chamber Rb1 of rear chamber Rb via an axial opening 41h formed in cylindrical portion 41A. The first passage P1 for communicating both variable pressure chambers ra1 and rb1 with each other is formed with the path a1, the slot 41g and the opening 41h. A path a2 is formed with axial slot 90c of the cylindrical sealing member 90, hub member 31 and cylindrical portion 41A of hub member 41 and communicates with the constant pressure chamber ra2 of front chamber Ra via a radial slot 31C formed in hub member 31 and also communicates with the constant pressure chamber rb2 of rear chamber Rb via an axial opening 41d formed in the hub member 41 and a radial opening 41C formed in hub member 41. The second passage P2 for communicating with both constant pressure chambers ra2 and rb2 with each other is formed with the path a2, the slot 31c and the openings 41c, 41d.

Figure 2:
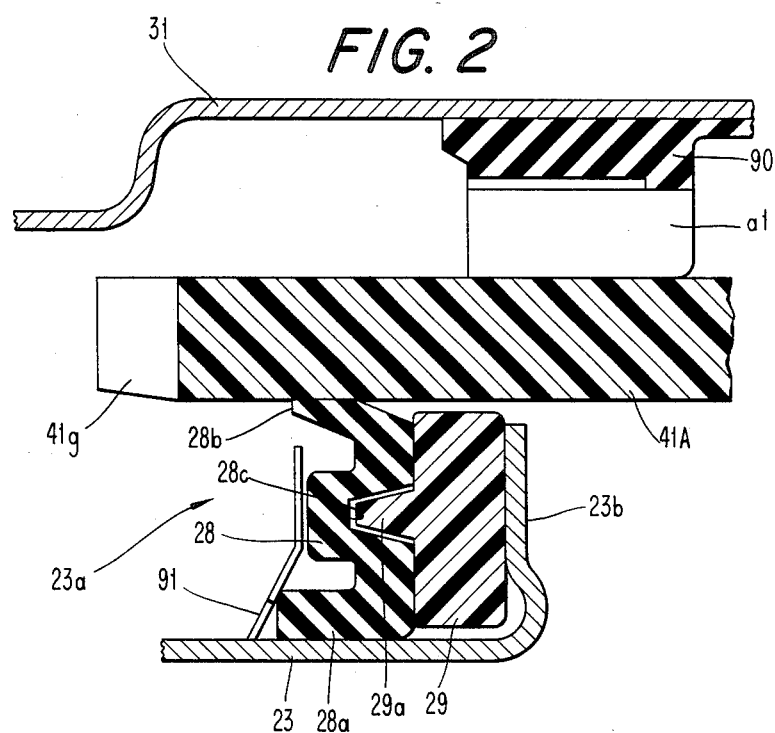
FIG. 2 is a partial enlarged view of first embodiment of a sealing mechanism according to the present invention.

As shown in FIGS. 1 and 2, the sealing member 28 and ring bearing 29 are press-fit to a flange portion 23b of partition wall 23 by a biasing force of a retainer 91 fitted in the hole 23a of partition wall 23. The sealing member 28 includes a sealing portion 28a for hermetically contacting the partition wall 23 at outer circumferential portion thereof and a lip portion 28b for hermetically contacting with the cylindrical portion 41A of hub member 41 at inner circumferential portion thereof, and an annular groove 28C. The ring bearing 29 for axially slidably guiding the cylindrical portion 41A of hub member 41 includes an annular projection 29a for engaging with the groove 28C of sealing member 28. By the engaging structure of sealing member 28 and ring bearing 29, even if the ring bearing 29 shrinks and moves in axial and radial directions due to thermal hysteresis as described above, the sealing member 28 is moved with the bearing 29. The sealing member 28 and the cylindrical portion 41A of hub member 41 guided by the ring bearing 29 will be maintained in a co-axial relationship due to the engagement. Consequently, the pressing force of lip portion 28b of sealing member 28 to the cylindrical portion 41A of hub member 41 is equally maintained in any position of the lip portion 28b of sealing member 28. As a result, the sealing performance of lip portion 28b of sealing member 28 is maintained Operation of the fluid pressure servomotor is set forth below.

When the input push rod 60 moves leftwardly by depressing the brake pedal, the poppet valve 52 is moved leftwardly in accordance with the leftward movement of plunger 51 by the compression force of spring 53 and is engaged with valve seat 41b, whereby the leftward movement of the poppet valve 52 is stopped by valve seat 41b. The variable pressure chamber rb1 would then be cut off from the constant pressure chamber rb2 and subsequently communicated with atmosphere by disengaging poppet valve 52 with valve seat 51a due to further leftward movement of plunger 51. In such condition, both constant pressure chambers ra2 and rb2 are kept in negative pressure. Therefore, by the differential pressure between the variable pressure chambers ra1 and rb1 and the constant pressure chamber ra2 and rb2, the hub members 31 and 41 and the guide 70 move leftwardly via diaphragms 33 and 43. As a result, the push rod 72 transmits an output to the brake booster operation.

Figure 3:
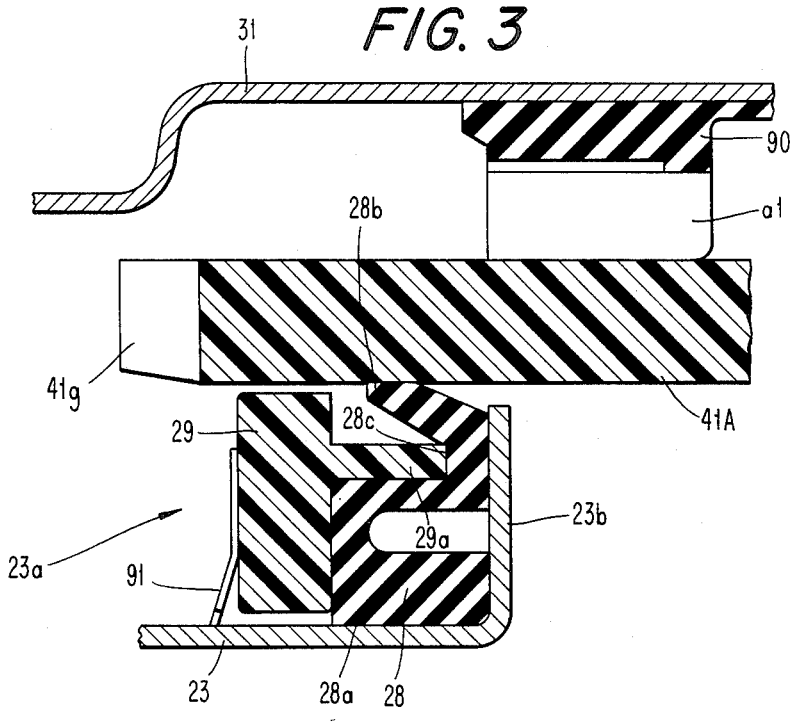
FIG. 3 is a partial enlarged view of second embodiment of a sealing mechanism according to the present invention.

FIG. 3 shows second embodiment according to the present invention. This embodiment differs from the arrangement of FIG. 2 by reversing the positions of the sealing member 28 and ring bearing 29. Additionally, the projection 29A of the ring bearing 29 is engaged with a ledge section provided on an upper portion of the sealing member 28.

Figure 4:
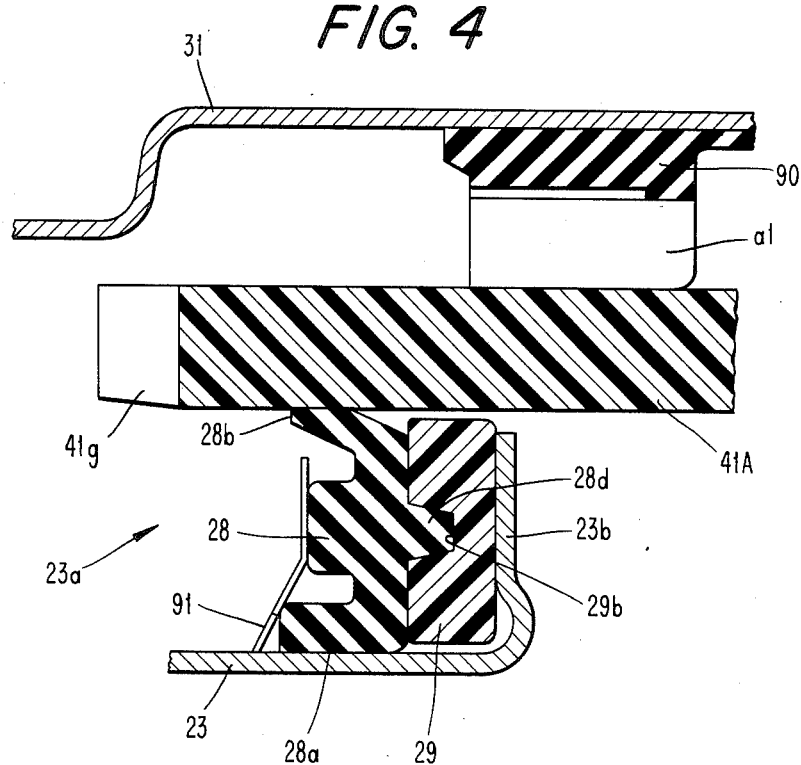
FIG. 4 is a partial enlarged view of third embodiment of a sealing mechanism according to the present invention.

FIG. 4 shows the third embodiment of the present invention in which the engaging arrangement is inverted with respect to the embodiment of FIG. 2. Engaging means for engaging the sealing member 28 with the ring bearing 29 comprises a groove 29b formed in the ring bearing 29, and a projection 28d engaging with the groove 29b formed on the sealing member 28.

Obviously, many modifications and variations of the present invention are possible in light of the above teachings. It is therefore to be understood that within the scope of the appended claims the invention may be practiced otherwise than as specifically described herein.

What is claimed is:

1. A fluid pressure servomotor comprising:
   a housing;
   a partition wall arranged in said housing;
   a center opening formed in said partition wall;
   a hub member having a cylindrical portion;
   a ring bearing axially slidably guiding said cylindrical portion of said hub member and received in said opening of said partition wall;
   a sealing member received in said opening and including a sealing portion hermetically engaged with said partition wall and a lip portion hermetically engaged with said cylindrical portion of said hub member;
   a retainer for retaining said sealing member and said ring bearing between said partition wall and said cylindrical portion of said hub member; and
   engaging means for engaging said sealing member with said ring bearing, said engaging means including a groove in one of said sealing member and said ring bearing and a projection for engaging said groove formed on the other of said sealing member and said ring bearing, the sealing member being movable with the ring bearing by the engaging means engaging said sealing member and said ring bearing, said cylindrical portion and said sealing member being maintained in a co-axial relationship.

2. A fluid pressure servomotor of claim 1, wherein said groove is formed in said sealing member and said projection is formed on said ring bearing.

3. A fluid pressure servomotor of claim 1, wherein said groove is formed in said ring bearing and said projection is formed on said sealing member.

4. A fluid pressure servomotor of claim 1 wherein said partition wall further comprises a flange supporting one of said sealing member and said ring bearing.

5. A fluid pressure servomotor of claim 4, wherein said flange is in direct contact with said ring bearing.

6. A fluid pressure servomotor of claim 4, wherein said flange is in direct contact with said sealing member.

7. A fluid pressure servomotor of claim 1, wherein said ring bearing is made of plastic material.

8. A fluid pressure servomotor of claim 1, wherein said groove is of an annular shape.

9. A fluid pressure servomotor of claim 8, wherein said projection is of an annular shape.

* * * * *